United States Patent
Chang et al.

[11] Patent Number: 5,960,062
[45] Date of Patent: Sep. 28, 1999

[54] METHOD OF RECORDING THE COMMUNICATION BETWEEN A CPE AND A SPCS/SERVER

[75] Inventors: Jackson Chang; Jeffrey Lai; Henry Lin; Men-Fu Chu, all of Taipei, Taiwan

[73] Assignee: Inventec Corporation, Taipei, Taiwan

[21] Appl. No.: 08/808,221

[22] Filed: Feb. 28, 1997

[51] Int. Cl.$^6$ .......................... H04M 1/64; H04M 11/00; H04M 13/00; H04M 1/00

[52] U.S. Cl. .................. 379/67.1; 379/88.01; 379/88.11; 379/93.01; 379/93.23; 379/93.31; 379/106.01; 379/164; 379/179; 379/372

[58] Field of Search ................................ 379/67.1, 88.08, 379/88.11, 93.01, 93.23, 106.01, 93.28, 93.29, 93.31, 93.35, 106.07, 106.08, 164, 179, 372, 375, 376

[56] References Cited

U.S. PATENT DOCUMENTS

| | | | |
|---|---|---|---|
| 5,394,461 | 2/1995 | Garland | 379/106 |
| 5,483,577 | 1/1996 | Gulick | 379/88 |
| 5,493,609 | 2/1996 | Winseck, Jr. et al. | 379/96 |
| 5,519,774 | 5/1996 | Battista et al. | 379/386 |

*Primary Examiner*—Fan S. Tsang
*Assistant Examiner*—Allan Hoosain
*Attorney, Agent, or Firm*—Sughrue, Mion, Zinn, Macpeak & Seas, PLLC

[57] ABSTRACT

A method of recording the bi-directional communication between a customer premises equipment (CPE) and a server of a stored program controlled system (SPCS) in an analog display services interface (ADSI) for facilitating the troubleshooting therein is disclosed. The present invention includes accessing the telephone set by a user, therefore initiating the communication between the telephone set and the server. After receiving an alerting signal from the server, the alerting signal and the corresponding received time of the alerting signal are recorded into a trace area in the telephone set. A first acknowledgment signal is sent to the server after the alerting signal is recognized, and the first acknowledgment signal is then recorded in the trace area. At least one message is sent from the server, and then the message, a start received time and an end received time of the message are recorded into the trace area and a message buffer. Finally, a second acknowledgment signal is sent to the server, and the second acknowledgment signal is then recorded in the trace area.

11 Claims, 8 Drawing Sheets

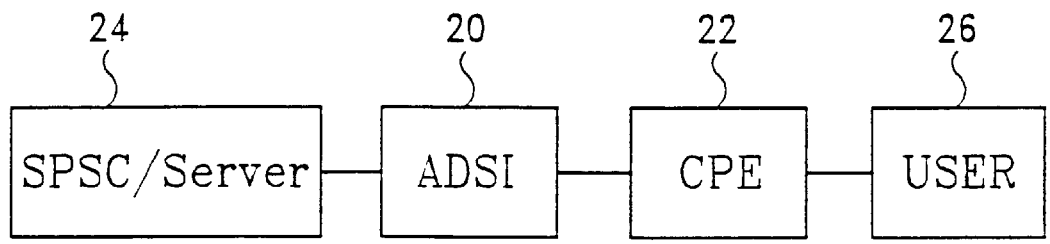
FIG.2A
| Frequencies | 1209Hz | 1336Hz | 1477Hz | 1633Hz |
|---|---|---|---|---|
| 697Hz | DTMF 1 | DTMF 2 | DTMF 3 | DTMF A |
| 770Hz | DTMF 4 | DTMF 5 | DTMF 6 | DTMF B |
| 852Hz | DTMF 7 | DTMF 8 | DTMF 9 | DTMF C |
| 941Hz | DTMF * | DTMF 0 | DTMF # | DTMF D |
FIG.2B
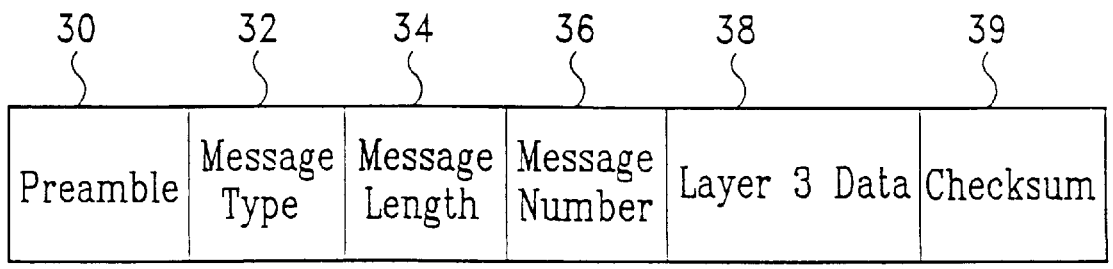
FIG.3

| | | | | |
|---|---|---|---|---|
| 0×01 | CAS type | 1000H | 0×00 | empty buffer |
| 0×10 | Time Low Byte | 1001H | 0×00 | |
| 0×00 | Time High Byte | 1002H | 0×00 | |
| 0×00 | | 1003H | | |
| 0×00 | | 1004H | | |
| 0×02 | DTMF type | | | |
| 0×20 | Time Low Byte | | | |
| 0×00 | Time High Byte | | | |
| 'A' | DTMF 'A' | | | |
| 0×00 | | | | |
| 0×00 | NULL type | | | |
| 0×00 | | | | |

FIG.11

| Message Type | |
|---|---|
| CAS TONE | 1 |
| DTMF | 2 |
| FSK Begin | 3 |
| FSK End | 4 |
| Dial Tone | 5 |
| Message Waiting Indicator Tone | 6 |
| Recall Dial Tone | 7 |
| Recorder | 8 |
| Line Busy | 9 |
| Audible Ringing | 10 |

FIG.9

METHOD OF RECORDING THE COMMUNICATION BETWEEN A CPE AND A SPCS/SERVER

BACKGROUND OF THE INVENTION

1. Field of the Invention

The present invention relates to a switching system such as an Analog Display Service Interface (ADSI), and particularly to a method of recording the bi-directional communication between a customer premises equipment (CPE) and a server of a stored program controlled system (SPCS) in an analog display services interface (ADSI) for facilitating the troubleshooting therein.

2. Description of the Prior Art

Since Alexander Graham Bell performed experiments on a device for sending signals over a conductive wire, the telephone has been growing as a practical device in the modern day. FIG. 1 shows the block diagram of a telephone set. Whenever a caller lifts the handset 10, or referred to as off hook, the telephone network or telephone system is then requested and ready for use by an indicated dial tone. Thereafter, the number of a called party is sent to the telephone network by rotating a dial 12 or by pressing number keys 14. A ringing signal detecting circuit or a ringer 16 in the telephone set of the called party detects the ringing signal and consequently generates some audible tone. After the handset on the called side is lifted, both parties can communicate to each other through transforming sound wave to or from electrical signals by the receiver (earpiece) 18 and the transmitter (mouthpiece) 19.

As the number of the telephones increases, a central office exchange (CO) is established to switch among the telephones. Each telephone is connected to the central office through a local loop consisting of the two wires or four wires. The status of the handset is detected by the CO through this local loop where a dc voltage, usually about 48 volts, is provided by the CO. When the number of the connected telephones further increases, a public switched telephone network is employed to accommodate more telephone connections in an effective manner.

As the telephone network grows larger and more complicated, varieties of functions and services become available. Caller identification (ID) display is a new service available in some modern telephone network, where the caller ID is sent during the beginning of the ringing. Among the many services available today, analog display service interface (ADSI) is one of the interfaces and associated communication protocols for bi-directional transmission of data between a switching system and an customer premises equipment (CPE), which resides and is operated at a custom site for performing intelligent function. Due to a nonperfect public switching network, which switches data between the CPE and a sever on the analog display service side, a nonperfect CPE or the server, error sometimes occurs. Unfortunately, there is no method or equipment for the user to identify the error. A need therefore has been arisen to provide a method to find out where the error comes from and what type the error is, so that an immediate correction can be made.

SUMMARY OF THE INVENTION

In accordance with the present invention, a method is provided for recording the bi-directional communication between a customer premises equipment (CPE) and a server of a stored program controlled system (SPCS) in an analog display services interface (ADSI) for facilitating the troubleshooting therein. Initially, the CPE is accessed by a user, therefore initiating the communication between the CPE and the server. After receiving a CPE alerting signal (CAS) from the server, the recognized CAS signal and the corresponding received time of the CAS signal are recorded into a trace area in the telephone set. After the CAS signal is recognized, a first acknowledgment signal is sent to the server, and the first acknowledgment signal is then recorded in the trace area. The first acknowledgment signal mentioned above is sent in a dual-tone multifrequency (DTMF) signaling format. At least one frequency shift keying (FSK) type message is sent from the server, which is then recorded into the trace area and a FSK buffer. A second DTMF type acknowledgment signal is sent to the server corresponding to the received message, and the second acknowledgment signal is then recorded in the trace area.

BRIEF DESCRIPTION OF THE DRAWINGS

FIG. 2A shows a schematic block diagram illustrating an ADSI between an analog display service CPE and a server of a SPCS.

FIG. 2B shows the frequency combinations of the DTMF signaling.

FIG. 3 shows the datalink layer frame format.

FIG. 9 shows the signaling type.

FIG. 11 shows a further example with a trace log buffer and a FSK buffer.

DESCRIPTION OF THE PREFERRED EMBODIMENT

Figure 1:
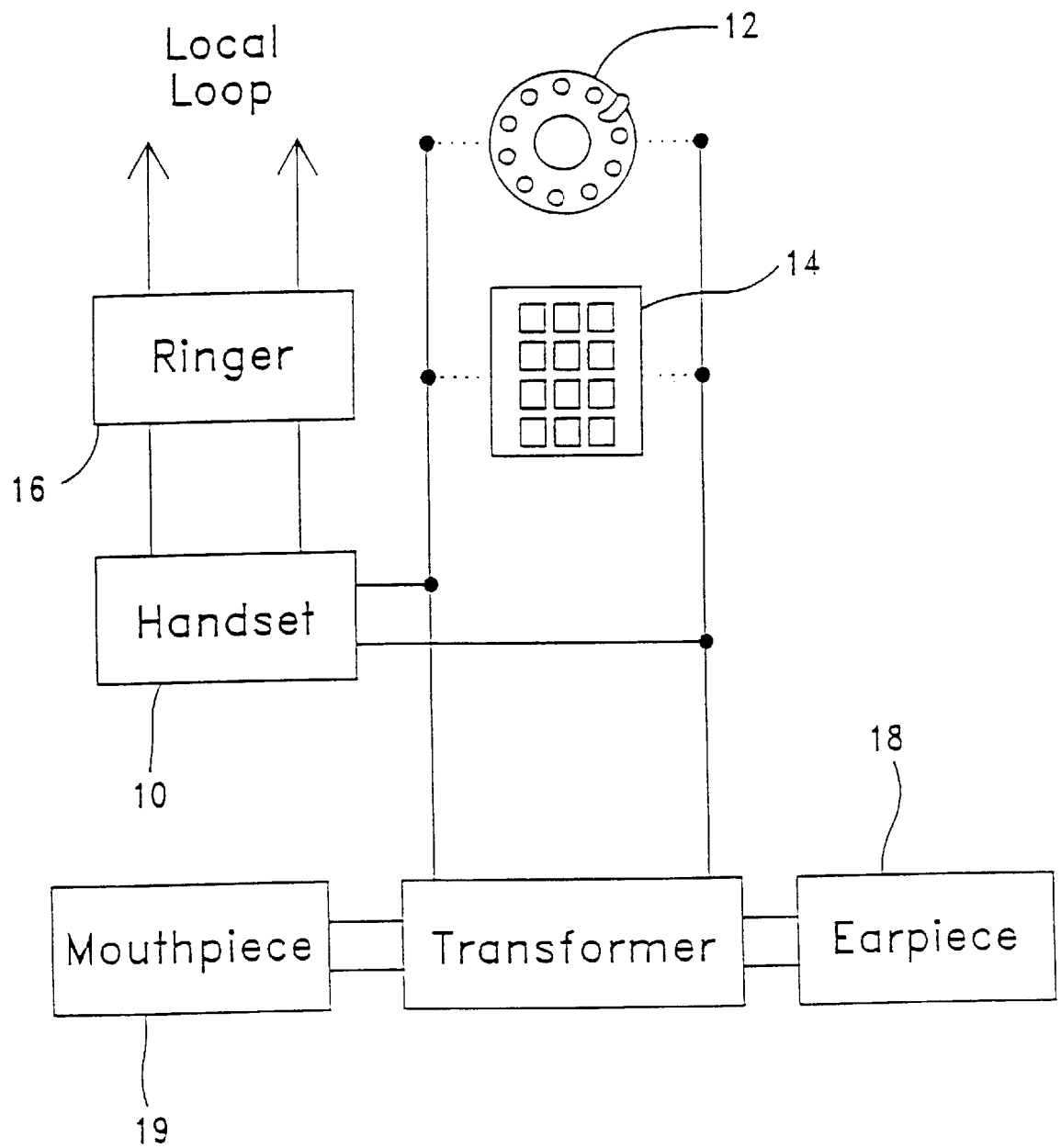
FIG. 1 shows the block diagram of a conventional telephone set.

FIG. 2A shows a schematic block diagram illustrating an Analog Display Service Interface (ADSI) 20 between an analog display service Customer Premises Equipment (CPE) 22 and a server of a Stored Program Controlled System (SPCS) 24. The CPE 22 resides and is operated at a user site 26 or a telephone set. The ADSI 20 provides an interface and associated communications protocol for bi-directional transmission of data between the SPCS 24, which is a switching system, and the CPE 22, therefore providing data transmission over the voice-grade facilities of the Public Switched Telephone Network (PSTN). Further, the transmission of Caller Identification (caller ID) can be implemented via the system shown in FIG. 2A.

The ADSI protocol provides bi-directional data communications with a CPE 22 that allows the user 26 to use screen-based information and call management features via the CPE 22. This protocol uses both Dual-Tone Multifrequency (DTMF) and physical layer protocol type modem signaling, such as Frequency Shift Keying (FSK) signaling. For example, the server of the SPSC 24 uses a voice band CPE Alerting Signal (CAS), which is a FSK type signal, to wake up the CPE 22 to receive data, and the CPE 22 then uses DTMF tones to provide acknowledgements and responses to the server 24. Typically, a user 26 through a telephone set initiates and causes the CPE 22 to go off-hook, and to dial the server 24 to request a desired service, where the CPE 22 acts as an agent for the user 26. FIG. 2B shows the frequency combinations of the DTMF signaling. For example, numeral 5 is transmitted via combining a 770 Hz signal and a 1336 Hz signal.

The protocol of the ADSI 20 includes three layers: physical layer, datalink layer, and message layer. The first (physical) layer is responsible for the transmission of the bit stream between the server's 24 modem and the user's 26 modem over the ADSI 20. Further, this layer describes the electrical signaling of both the DTMF and FSK used for ADSI 20.

The second (datalink) layer is used to provide reliable data transmission between the server 24 and the CPE 22 by establishing and releasing the connections between the server 24 and the CPE 22, by detecting errors or even correcting errors. FIG. 3 shows the datalink layer fame format, where the preamble 30 is used to alert the CPE 22 to incoming data. The content of the message type 32 indicates the capability associated with the data message. The number stored in the message length 34 indicates the total number of layer 3 data 38. Checksum 39 is used for message error detection by the CPE 22.

Figure 4:
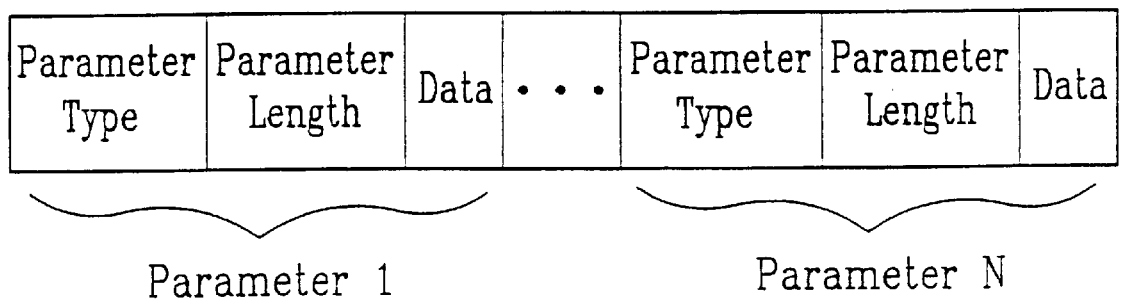
FIG. 4 shows the parameter message packet for the ADSI data message format.

The third (message) layer deals with the character set and data codes that are used, and the way the data should be displayed on the CPE 22. FIG. 4 shows the parameter message packet for the ADSI data message format, which includes a parameter type, a parameter length and data for each parameter.

Figure 5:
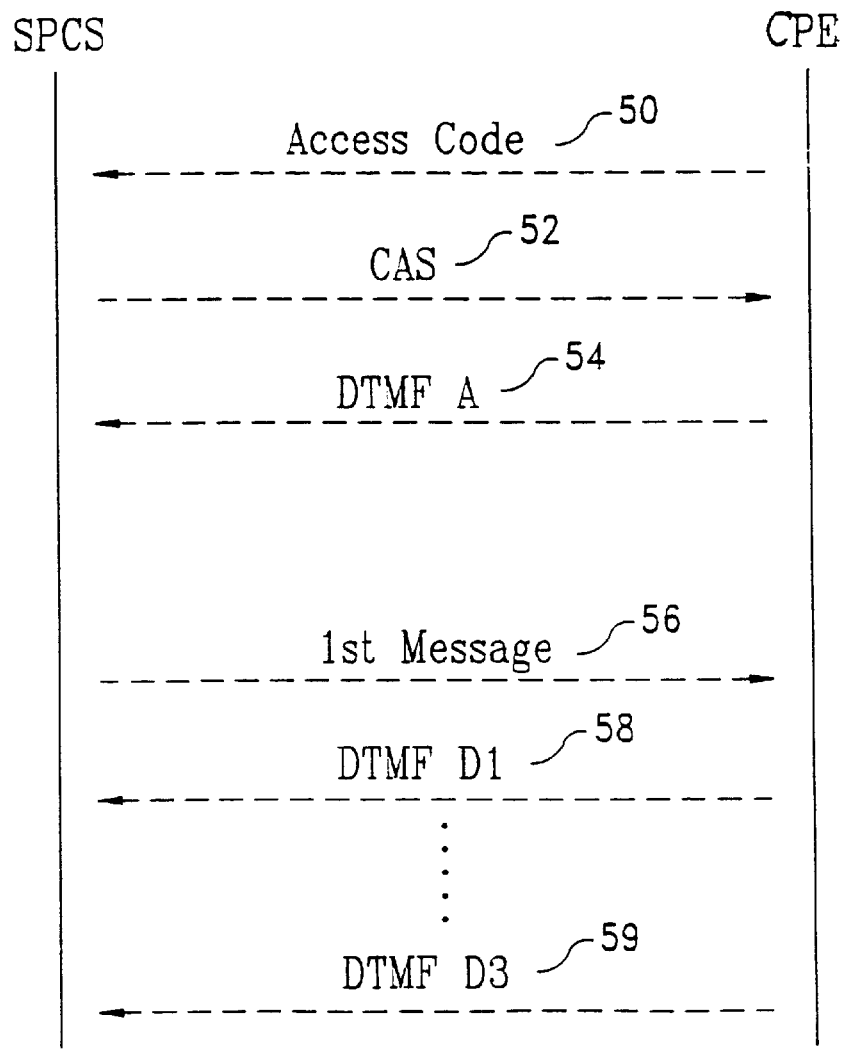
FIG. 5 shows the flow diagram demonstrating a typical ADSI server display control session.

The flow diagram in FIG. 5 demonstrates a typical ADSI server display control session, where a user interacts with a screen-based service. The user dials the SPCS with a feature access code 50 to initiate the service. The server of the SPCS then sends a voice band, dual tone CPE Alerting Signal (CAS) 52 to the CPE site. After the CPE recognizes the CAS signal 52, the CPE mutes the voice path at the handset and response to the SPCS with an acknowledgment signal—a DTMF A tone pair 54. Upon receipt of the acknowledgment DTMF A signal 54 from the CPE, the SPCS sends the first message 56 to the CPE. After receiving the first message, the CPE acknowledges receipt of the first message by transmitting DTMF D, 1 signals 58. In a similar manner, the SPCS and the CPE communicates over the ADSI until final message, three in this example, is sent, where the receipt of the final message is acknowledged by the DTMF D, 3 signals 59. It is noted that the SPCS need not wait for the first of these messages to be acknowledged before sending the second message to the CPE, so that the transmission speed can be increased.

Figure 6A:
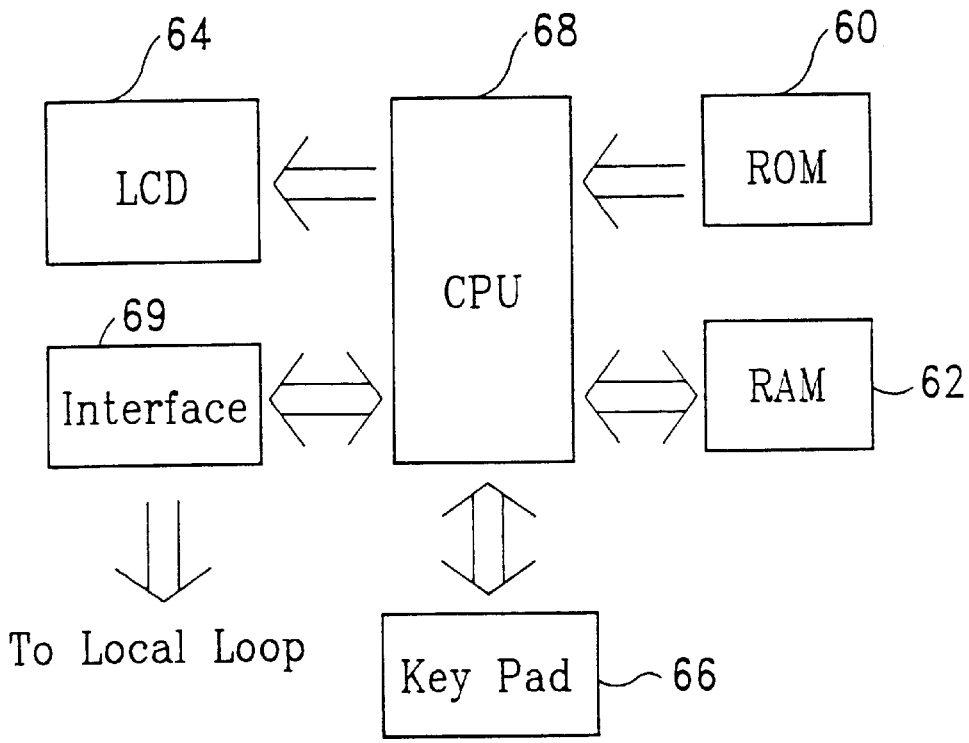
FIG. 6A shows the block diagram of a telephone set in connection with the present invention.
Figure 6B:
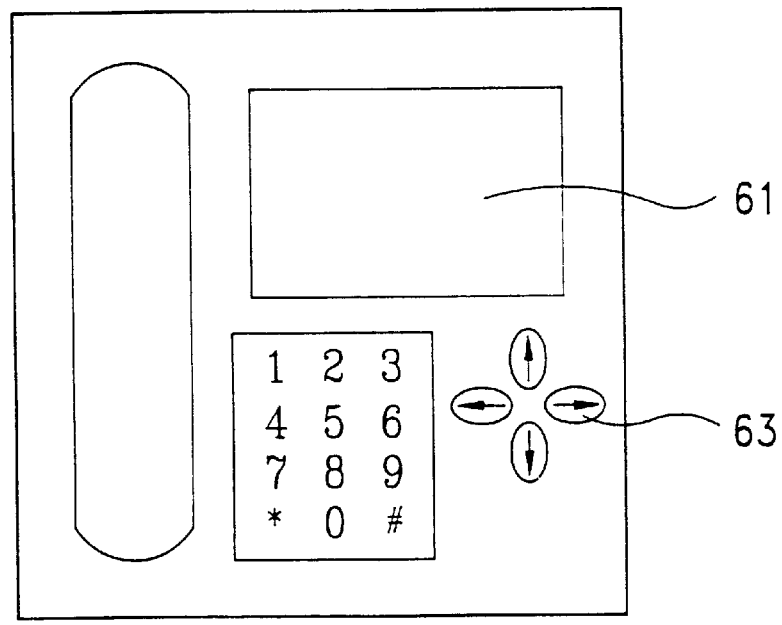
FIG. 6B shows the telephone set according to the present invention.

FIG. 6A shows the block diagram of a telephone set in connection with the present invention. The software program which implements the control procedures resides in a read only memory (ROM) 60. Data and the retrieved caller ID information are stored in a memory device 62 such as a random access memory (RAM), a flash memory or an electrically erasable programmable read only memory (EEPROM). A liquid crystal display (LCD) 64 and key pad circuit 66 are used to control the input/output of a telephone set. A central processing unit (CPU) 68 controls the aforementioned blocks and an interface 69, which sends out signal frequency pertinent to a dialing telephone number to the local loop from a central office exchange (CO). FIG. 6B shows the telephone set according to the present invention, where a LCD display screen 61 is used for viewing and tracing the stored data by a cursor control pad 63.

Figure 7:
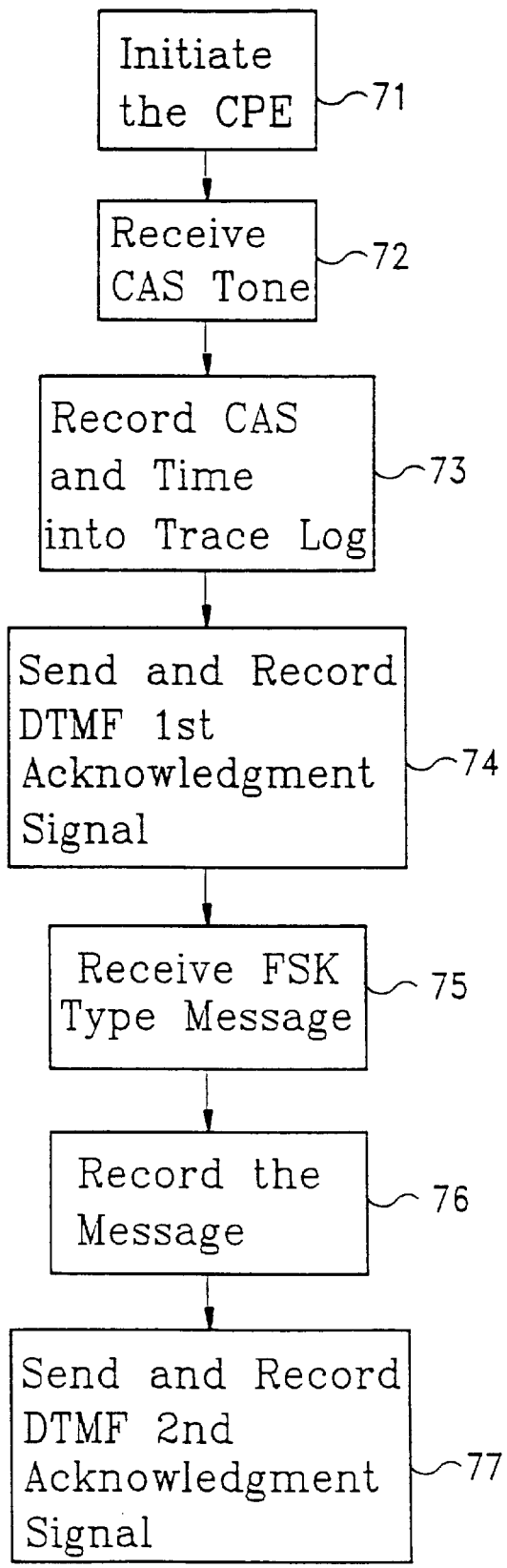
FIG. 7 shows the flow diagram illustrating a method of recording the bi-directional communication between a CPE and a server of a SPCS in an ADSI.

FIG. 7 shows the flow diagram illustrating a method of recording the bi-directional communication between a CPE and a server of a SPCS in an analog display services interface (ADSI) for facilitating the troubleshooting. Initially, the CPE is accessed by a user in step 71, therefore initiating the communication between the CPE and the server. After receiving a CPE alerting signal (CAS) from the server in step 72, the recognized CAS signal and the corresponding received time of the CAS signal are recorded (in step 73) into a trace area in the telephone set. After the CAS signal is recognized, a first acknowledgment signal is sent (in step 74) to the server, and the first acknowledgment signal is then recorded (also in step 74) in the trace area. The first acknowledgment signal mentioned above is sent in a dual-tone multifrequency (DTMF) signaling format. In step 75, at least one frequency shift keying (FSK) type message is sent from the server, which is then recorded (in step 76) into the trace area and a FSK buffer. A second DTMF type acknowledgment signal is sent in step 77 to the server corresponding to the received message, and the second acknowledgment signal is then recorded (also in step 77) in the trace area.

Figure 8:
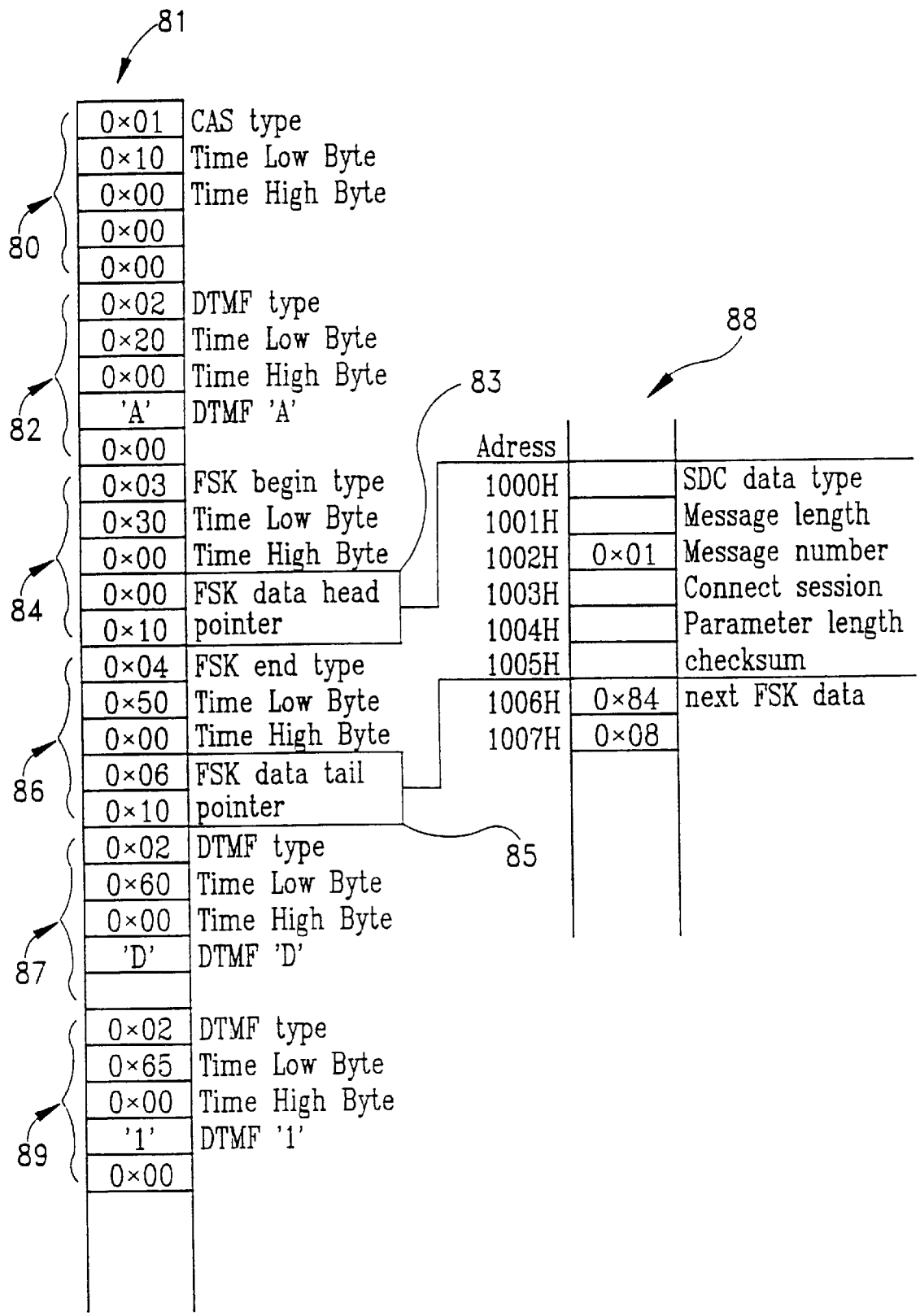
FIG. 8 shows an example with a trace log buffer and a FSK buffer.

According to the present invention illustrated in the flow diagram of FIG. 7, the troubleshooting can therefore be successful. Three examples are demonstrated in the following. In the first example, the server sends a CAS tone signal, which is received by the CPE and is recorded in the area 80 of a trace log buffer 81 as shown in FIG. 8. The stored signaling type is summarized in FIG. 9. The associated received time of the CAS tone is also stored in the trace log 81. The CPE acknowledges by sending a DTMF A signal, which is recorded in area 82 with the associated sent time. After the receipt of the DTMF A signal, a FSK type connect session command is sent to the CPE. After recognizing this command, the CPE records the FSK signal and its associated time in areas 84 and 86, where a FSK data pointers 83 and 85 are used to point to the addresses of a FSK buffer 88. The server data control (SDC) data type, message length, message number, connection session, parameter length and checksum are sequentially stored in the FSK buffer 88. For acknowledging the receipt of the FSK signal, the CPE sends DTMF D, 1 signals to the server. The DTMF D, 1 signals are then stored in areas 87 and 89 respectively. The aforementioned stored data in the trace log buffer 81 and the FSK buffer 88 can be recalled and viewed on the liquid crystal display of the telephone set. Through checking the content of these data, troubleshooting is made possible by tracing through the content of the signals and their timing.

Figure 10:
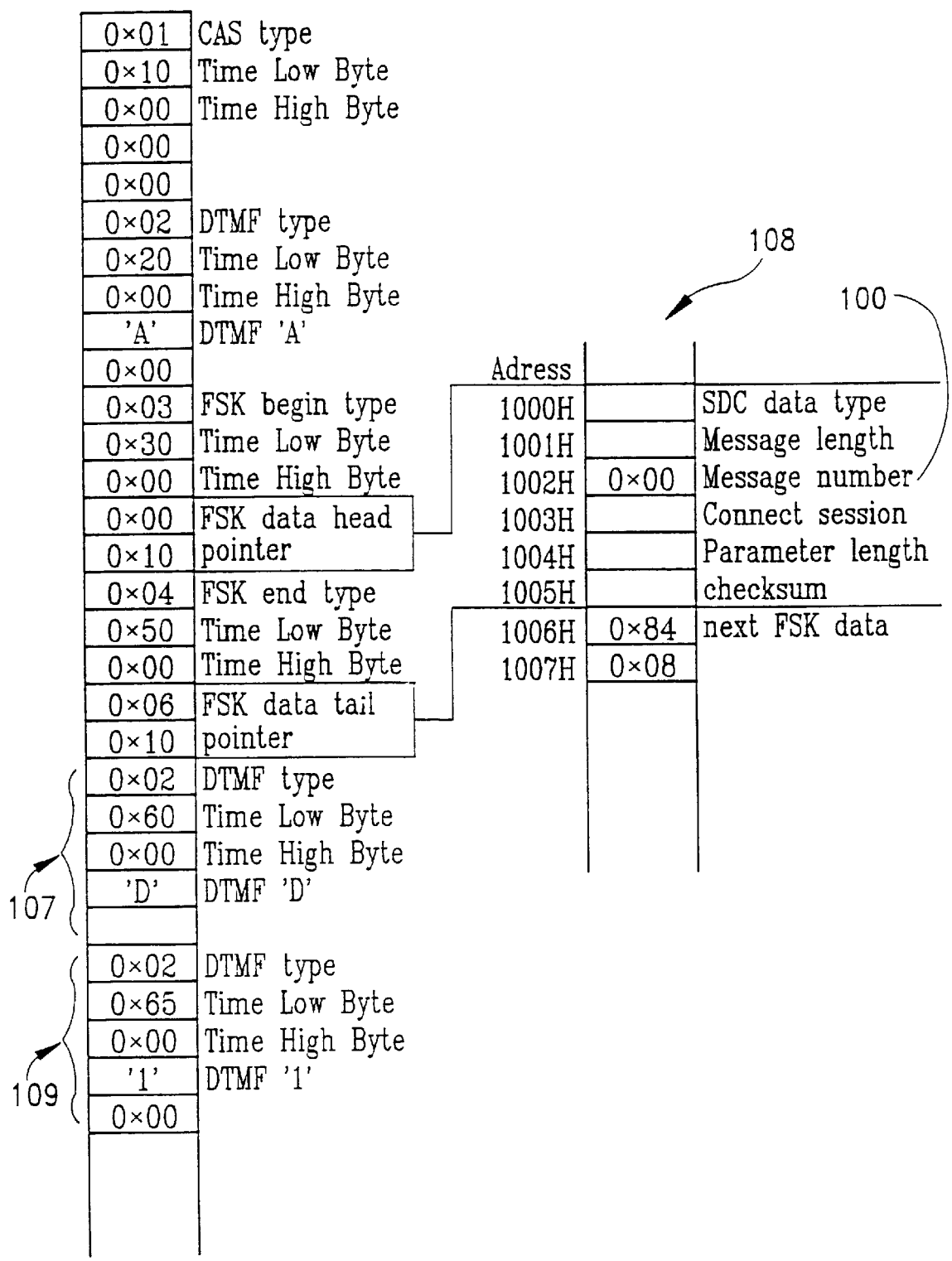
FIG. 10 shows another example with a trace log buffer and a FSK buffer.

FIG. 10 shows another example similar to that in FIG. 8, except that the content of the message number (100) in the FSK buffer 108 is 0×00 instead of a predicted 0×01 as in FIG. 8. Also, the acknowledgment signals from the CPE are DTMF D, 0 (107 and 109) instead of DTMF D, 1 for a successful connection session. Through tracing the stored data, the user can identify the FSK data error.

A further example is shown in FIG. 11. In this trace log 111, no further command is sent from the server after the CAS tone 110 is received. By checking the time lapse between the CAS tone 110 and DTMF A signal 112, a total time of 150 ms is recognized as an abnormal condition that exceeds the server's time-out requirement of 100 ms.

It is appreciated that the examples mentioned above are used only to demonstrate the applications according to the present invention, but not to limit the scope of the present invention. For example, the CPE also responds a DTMF signal when receiving a soft key in an ADSI administrative procedure. Further, the telephone set stores any incoming call progress tone (CPT) into the trace log.

What is claimed is:

1. A method of recording the communication between a telephone set and a server of a switching system for facilitating the troubleshooting therein, said method comprises:

accessing the telephone set by a user, therefore initiating the communication between the telephone set and the server;

receiving an alerting signal from the server, said alerting signal being used for waking up the telephone set to receive incoming data;

recording the alerting signal and the corresponding received time of the alerting signal into a trace area in the telephone set;

sending a first acknowledgment signal to the server after the alerting signal is recognized, said first acknowledgment signal being then recorded in the trace area;

receiving at least one message from the server;

recording said at least one message, a start received time and an end received time of the message into the trace area and a message buffer; and sending at least a second acknowledgment signal to the server, said second acknowledgment signal being then recorded in the trace area, wherein the troubleshooting is performed by analyzing said alerting signal, said first acknowledgment signal, said at least one signal, said start received time, and said end received time recorded into the trace area and the message buffer in said telephone set.

2. The method according to claim 1, wherein said switching system comprises a stored program controlled system (SPCS).

3. The method according to claim 2, wherein said telephone set comprises an analog display service (ADS) customer premises equipment (CPE).

4. The method according to claim 3, further comprising an analog display service interface (ADSI) between said SPCS and said CPE.

5. The method according to claim 4, wherein said alerting signal is a CPE alerting signal (CAS).

6. The method according to claim 1, wherein said first acknowledgment signal and said second acknowledgment signal are sent in a dual-tone multifrequency (DTMF) signaling format.

7. The method according to claim 1, wherein said message from the server is in a physical layer protocol type modem based signaling format.

8. The method according to claim 7, wherein said message from the server is in a frequency shift keying (FSK) modulation format.

9. The method according to claim 1, wherein said message recorded in the trace area comprises a pointer, the content of said pointer pointing to an address of the message area thereat the message begins.

10. A method of recording the bi-directional communication between a customer premises equipment (CPE) and a server of a stored program controlled system (SPCS) in an analog display services interface (ADSI) for facilitating the troubleshooting therein, said method comprises:

accessing the CPE by a user, therefore initiating the communication between the CPE and the server;

receiving a CPE alerting signal (CAS signal) from the server, said CAS signal being used for waking up the CPE to receive incoming data;

recording the CAS signal and the corresponding received time of the CAS signal into a trace area in the telephone set;

sending a first acknowledgment signal to the server after the CAS signal is recognized, said first acknowledgment signal being then recorded in the trace area, and said first acknowledgment signal being sent in a dual-tone multifrequency (DTMF) signaling format;

receiving at least one message from the server, said message from the server being in a frequency shift keying (FSK) modulation format;

recording said at least one message, a start received time and an end received time of the message into the trace area and a message buffer; and sending at least a second acknowledgment signal to the server, said second acknowledgment signal being then recorded in the trace area, and said second acknowledgment signal being sent in a dual-tone multifrequency (DTMF) signaling format, wherein the troubleshooting is performed by analyzing said alerting signal, said first acknowledgment signal, said at least one signal, said start received time, and said end received time recorded into the trace area and the message buffer in said telephone set.

11. The method according to claim 10, wherein said message recorded in the trace area comprises a pointer, the content of said pointer pointing to an address of the message area thereat the message begins.

* * * * *